United States Patent [19]

Kittel

[11] Patent Number: 4,635,262
[45] Date of Patent: Jan. 6, 1987

[54] METHOD OF DETECTING SYNCHRONIZATION ERRORS IN A DATA TRANSMISSION SYSTEM USING A LINEAR BLOCK CODE

[75] Inventor: Ludwig Kittel, Heroldsgbesg, Fed. Rep. of Germany

[73] Assignee: U.S. Philips Corporation, New York, N.Y.

[21] Appl. No.: 618,976

[22] Filed: Jun. 11, 1984

[30] Foreign Application Priority Data

Jun. 10, 1983 [DE] Fed. Rep. of Germany ....... 3320948

[51] Int. Cl.[4] ............................................. G06F 11/10
[52] U.S. Cl. ............................................ 371/42; 371/5
[58] Field of Search ................... 371/42, 5, 47, 40, 39; 364/200, 900

[56] References Cited

U.S. PATENT DOCUMENTS

| | | | |
|---|---|---|---|
| 3,336,467 | 8/1967 | Frey | 371/42 |
| 3,398,400 | 8/1968 | Rupp | 371/42 |
| 4,110,558 | 8/1978 | Kageyama | 371/42 |
| 4,206,440 | 6/1980 | Doi | 371/39 |
| 4,271,520 | 6/1981 | Coombes | 371/42 |
| 4,312,070 | 1/1982 | Coombes | 371/40 |
| 4,466,099 | 8/1984 | Meltzer | 371/47 |
| 4,468,752 | 8/1984 | Chatham | 371/47 |
| 4,541,091 | 9/1985 | Nishida | 371/39 |

Primary Examiner—Michael R. Fleming
Attorney, Agent, or Firm—Thomas A. Briody; William J. Streeter; Leroy Eason

[57] ABSTRACT

In a data transmission system messages can be transmitted in the form of sequentially linked modified code words of a linear block code, the modified code words being produced by combining the code words formed from the data with a protection word.

When such modified code words are interleaved bit-wise in order to recognize random errors, the sequence of code words of the transmitted message may be changed after de-interleaving at the receiver, by bit shift, due to faulty synchronization of the transmitter and receiver. In order to recognize this, each code word is linked to a protection word which identifies its position within the message. The modified code words thus obtained are interleaved bit-wise, transmitted and de-interleaved again at the receiver. Each word thus obtained at the receiver is combined with a check word identifying its position within the message. The protection words and the check words are chosen so that the key words produced by combining them are in code word sub-classes which are not used for decoding.

5 Claims, 5 Drawing Figures

| f | $c_L$ | | | |
|---|---|---|---|---|
| | 1 | 2 | 3 | 4 |
| -3 | *2 | *3 | *4 | 1 |
| -2 | *3 | *4 | 1 | 2 |
| -1 | *4 | 1 | 2 | 3 |
| 0 | 1 | 2 | 3 | 4 |
| 1 | 2 | 3 | 4 | 1* |
| 2 | 3 | 4 | 1* | 2* |
| 3 | 4 | 1* | 2* | 4* |

| L | $z_L$ | $w_L, w_K$ |
|---|---|---|
| 1 | 0 | 0 0 0 0 0 0 0 0 0 0 0 0 0 0 |
| 2 | 25 | 0 0 0 0 0 0 0 0 0 1 1 0 0 1 |
| 3 | 44 | 0 0 0 0 0 0 0 0 1 0 1 1 0 0 |
| 4 | 53 | 0 0 0 0 0 0 0 0 1 1 0 1 0 1 |
| 5 | 138 | 0 0 0 0 0 0 0 1 0 0 0 1 0 1 0 |
| 6 | 147 | 0 0 0 0 0 0 0 1 0 0 1 0 0 1 1 |
| 7 | 166 | 0 0 0 0 0 0 0 1 0 1 0 0 1 1 0 |
| 8 | 191 | 0 0 0 0 0 0 0 1 0 1 1 1 1 1 1 |
| 9 | 111 | 0 0 0 0 0 0 0 0 1 1 0 1 1 1 1 |
| 10 | 118 | 0 0 0 0 0 0 0 0 1 1 1 0 1 1 0 |

FIG. 4

|   | $W_L$ | 1 | 2 | 3 | 4 | 5 | 6 | 7 | 8 | 9 | 10 |
|---|---|---|---|---|---|---|---|---|---|---|---|
| $W_K$ | | | | | | | | | | | |
| 1 | | 0 | 25 | 44 | 53 | 138 | 147 | 166 | 191 | -111 | -118 |
| 2 | | 25 | 0 | 53 | 44 | 147 | 138 | 191 | 166 | -118 | -111 |
| 3 | | 44 | 53 | 0 | 25 | 166 | 191 | 138 | 147 | 67 | 90 |
| 4 | | 53 | 44 | 25 | 0 | 191 | 166 | 147 | 138 | 90 | 67 |
| 5 | | 138 | 147 | 166 | 191 | 0 | 25 | 44 | 53 | 229 | 252 |
| 6 | | 147 | 138 | 191 | 166 | 25 | 0 | 53 | 44 | 252 | 229 |
| 7 | | 166 | 191 | 138 | 147 | 44 | 53 | 0 | 25 | 201 | 208 |
| 8 | | 191 | 166 | 147 | 138 | 53 | 44 | 25 | 0 | 208 | 201 |
| 9 | | -111 | -118 | 67 | 90 | 229 | 252 | 201 | 208 | 0 | 25 |
| 10 | | -118 | -111 | 90 | 67 | 252 | 229 | 208 | 201 | 25 | 0 |

FIG.5

METHOD OF DETECTING SYNCHRONIZATION ERRORS IN A DATA TRANSMISSION SYSTEM USING A LINEAR BLOCK CODE

BACKGROUND OF THE INVENTION

1. Field of the Invention

The invention relates to a method of detecting and possibly correcting errors caused by loss of synchronization of a data sink with a data source in a data transmission system using a linear block code.

2. Description of the Related Art

In a data transmission system having a data sink and a data source messages are exchanged between the sink and the sources over transmission channels. Such messages may have a word structure and consist, for example, of linked code words in a linear block code. A block code is a code in which all code words are of equal lengths, a sequence of symbols (or source words) to be encoded being divided into blocks of equal lengths. A systematic code is one in which a particular code word is assigned to each of the symbols or source words provided by the data source. In a linear systematic block code each linear combination of code words also constitutes a code word.

Consecutive code words are linked and transmitted in a continuous sequence over the transmission channel. In order to be separated at the receiver, it is necessary to synchronize the decoder therein with the encoding effected at the transmitter. This is denoted word synchronization.

In "Fehlerkorrigierende Block-Codierung fur die Datenubertragung" by F. J. Furrer, Birkhauser Verlag, 1981, pages 238 to 250, a description is given of methods of word synchronization for consecutively transmitted code words using synchronization samples, codes with binary prefixes, separable codes and synchronizable codes. Which synchronization method is chosen, as well as the method of encoding, depends on the properties of the transmission channel. For the purpose of synchronization, a synchronization sample can be used which is a fixed bit sequence of a predetermined length and which is known to the receiver (see, for example, ISO recommendation 3309–1979). However, including a synchronization sample at the beginning of a message and repeating it at predetermined distances (numbers of bits) within the message reduces the effective data transmission speed of the transmission channel.

A further method of word synchronization is disclosed in "Error-Correcting Codes" by Peterson/Weldon, 2nd Edition 1972 at pages 374 to 390. In this method all the sequentially transmitted code words are linked to the same error protection word, whereby a bit-wise shift of the code words of a message can be recognized. The protection word, which is not a code word, is added at the transmitter and subtracted at the receiver. On page 379 an example is described in which the protection word for a binary code is chosen to be equal to "1", as a result of which the last bit of each of the code words is inverted. If the code words are shifted through one or more bit positions, then, because of the fact that the encoding instruction is violated, this bit shift can be recognized and possibly corrected at the receiver.

So as to render it possible to use codes which recognize or correct randomly occurring errors, which may occur in transmission over channels which are susceptible to interference and have error bursts, for example radio transmission channels, the individual code words can be interleaved bit-wise prior to transmission. For the purpose of bit-sequential interleaving the first bit of each of the code words is transmitted, then the second bit of each of the code words, and so on until the last bits of all the coce words of the messages are joined together. Such interleaving is described in the article by B. Dorsch "Performance and Limits of Coding for Simple Time Varying Channels", 1980, International Zurich Seminar on Digital Communications, Proceedings IEEE Catalog No. 80 CH 1521-4, left-hand column of page G 1.1).

SUMMARY OF THE INVENTION

The invention is based on recognition that faulty synchronization in bit-wise interleaved code words of message evidences itself as a change in the sequence of the interleaved code words at the receiver, and provides a method of word synchronization by which such changes in sequence of received code words of a message can be recognized.

If the code words of a message in linear block code are bit-wise interleaved and transmitted over a disturbed transmission channel, then a change in the sequence of the received code words as compared with the transmitted sequence may occur. By linking the code words with protection words or check words which identify the position of the code words within the message, such a change in sequence can be recognized unambiguously. Taking account of the predetermined encoding instructions, appropriate protection words or the check words can readily be selected. During transmission over a disturbed transmission channel an error burst may occur in a code word. By bit-wise interleaving the code words, the error burst is distributed over several code words. Consequently, the word error probability and the residual error probability are less than in block-sequential transmission of successive code words.

If a linear systematic code is used the length of the protection or check words may be limited to a particular portion ("check portion") of the code words. This renders it possible to reduce the cost and complexity of the circuitry at the receiver and at the transmitter for putting the method into effect.

The check words and protection words are respectively stored at the receiving and the transmitting ends. For duplex transmission systems, the required storage capacity can be reduced to 50% if the protection words are at the same time employed as the check words. The required storage capacity can be further reduced if the protection words and check words are code words of a linear code, the matrix for identifying them being stored in a memory.

Linking of code words with protection words or check words may be effected by bit-sequential module-2 addition, which is simple to effect and reduces the cost of the required circuits.

The invention will now be described in greater detail by way of example with reference to the accompanying drawings, in which FIG. 1 shows a block diagram of a data transmission system, FIG. 2 shows a message which is distorted by faulty synchronization of the transmitter and receiver.

FIG. 3 shows the change in the position of code words in dependence on a shift through f bit positions, FIG. 4 shows, in the form of a Table, protection words or check words in a predetermined code, and FIG. 5 shows, in the form of a Table for such a code, all the key words which, in the event of faulty synchronization, can be produced as a result of linking the protection words to the check words.

DESCRIPTION OF THE PREFERRED EMBODIMENTS

Figures 1, 2:
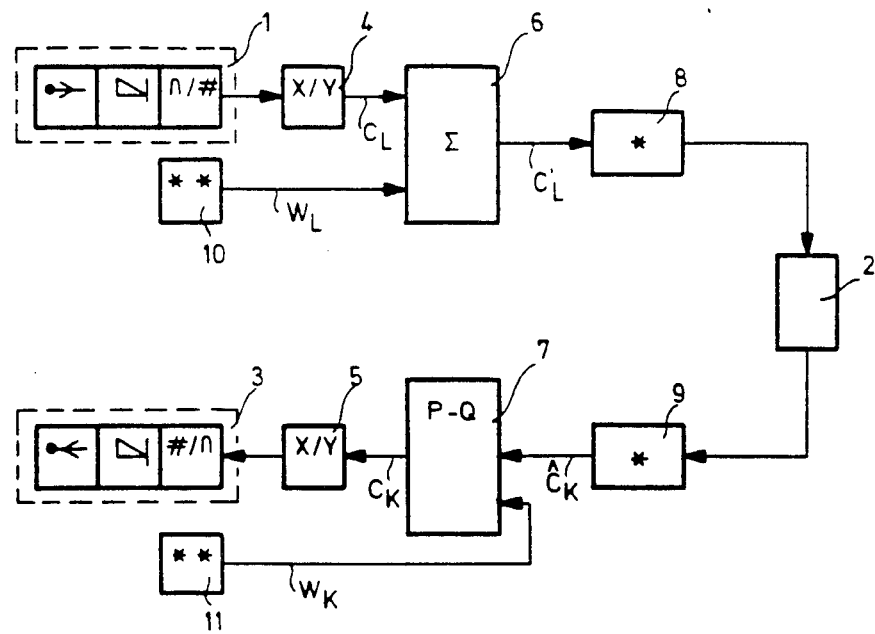

In the data transmission system shown in FIG. 1 for the transmission of messages M, a data source 1 is connected to a data sink 3 by a transmission channel 2. The transmitter comprises an encoder 4, an adder 6 and a circuit 8 for the bit-wise interleaving of modified code words $c'_L$ produced by adder circuit 6 from code words $c_L$ provided by encoder 4 from the data words provided by data source 1. The receiver comprises a circuit 9 for de-interleaving the modified code words $c'_L$ received from the transmission channel 2, a subtraction circuit 7 and a decoder 5. In accordance with stored encoding instructions, encoder 4 assigns code words $c_L$ to each of the symbols (data words) produced by the data source 1. In the adder circuit 6 a protection word $w_L$, which is characteristic of the position of the code word within the message N, is linked to each code word $c_L$. The protection words $w_L$ are obtained from a memory 10 in which they are stored. The modified code words $c'_L$ thus formed are interleaved bit-wise by interleaving circuit 8 and are transmitted. At the receiver they are first de-interleaved by circuit 9, and each of the de-interleaved received code words $c_K$ is linked in a subtraction circuit 7 to a check word $w_K$ which is characteristic of the position of the de-interleaved word within the message M. The ckeck words $w_K$ are obtained from a memory 11 in which they are stored.

When the data source 1 and the data sink 3 are in synchronization with each other, the code word $c_K$ produced at the output of the subtraction circuit 7 in the receiver will be identical to the transmitted code word $c_L$. The code word $c_K$ is converted into the corresponding data word in the decoder 5, and then applied to the data sink 3 for message evaluation. Any error in word block synchronization will result in faulty message evaluation in data sink 3.

The system in FIG. 1 may represent a radio transmission system, numbers identifying the various radio subscribers being transmitted, for example, as messages M over the transmission channel 2 between a mobile subscriber station (such as data source 1) and a fixed radio station (such as data sink 3). In the direction from the mobile subscriber station to the fixed radio station a message M may comprise for example, ten code words; and in the opposite direction a message may comprise eight code words. A faulty message evaluation could, for example, result in a call being charged to the wrong account.

FIG. 2 shows in the form of a Table the bit-wise interleaving of the transmitted modified code words $C'_L$ and the bit-wise de-interleaving of the received modified words $ĉ_K$. In the event of faulty synchronization, for example when the transmitted modified code words $c'_L$ are shifted through two bit positions at the receiver, an interchanging of code words occurs. The Table shows a message M consisting of sixteen code elements, to which four code words ($c'_L$, $ĉ_K$) with a number of positions equal to four are assigned. The sixteen positions of the bit sequence of the transmitted and received code words of the message M are indicated at the head of the Table. In the column on the left in the Table the transmitted modified code words $c'_L$ and also the received modified code words $ĉ_K$ are arranged according to their sequence in the message M. The Table illustrates case of faulty synchronization by two bit positions, whereby the sequence of the transmitted words ($c'_1, c'_2, c'_3, c'_4$) is interchanged; that is to say, the received code words $ĉ_K$ are in a difference sequence ($c'_3, c'_4, c'_1, c'_2$). The code elements in the Table are identified by indices, for example $c'_{2,4}$, indicating that this particular code element is in the fourth position of the second modified code word $c'_L$. The crosses (x) in the fifteenth and sixteenth bit positions within the received message M indicate that elements in these positions do not correspond to any code elements of code words in the transmitted message M. A shift through two bit positions causes a change by two positions in the sequence of the received word $ĉ_K$.

The Table in FIG. 3 shows the possible sequences of the four received code words $c_K$ resulting from a shift through a number of bit positions of a message M comprising four transmitted code words $c_L$. In the Table the left-hand column signifies such shifts through up to three bit positions, the sign indicating the direction of shift. A negative sign signifies that the word $c_K$ is received too late, and a positive sign that it was received too early, relative to the transmitted sequence of the code words $c_L$ (or the modified code words $c'_L$).

Because of such faulty synchronization, the sequence of the received code words $c_K$ is cyclically changed relative to the sequences of the transmitted code words $c_L$, and additional shifts occur in the last f or first f of the words $c_K$. In the Table in FIG. 3 the words $c_K$ in which such additional shifts occur are indicated by an asterisk.

The probability that a message M is evaluated incorrectly because of faulty synchronization is very great even from a shift through only a few bit positions. In a linear code it is possible that owing to the bit shift in each of the words $c_K$ a binary sample will be produced which is one of the stored code words, thereby signifying nonexistent data.

To recognize faulty synchronization, the sequence of the code words $c_L$ to be transmitted is identified in accordance with the invention by linking each such code word to a protection word $w_L$ in accordance with the linking instruction $$c'_L = c_L \oplus w_L$$

A bit-wise modulo-2 addition is preferably used to carry out this linking instruction.

After bit-wise interleaving, transmission and de-interleaving, each received modified code word $ĉ_K$ is linked to a check word $w_K$ to derive a code word $c_K$ in accordance with the linking instruction $$c_K = ĉ_K \oplus w_K.$$

This instruction is also preferably effected by means of modulo-2 addition. This results in formation of a key word $w_{KL}$ in accordance with the linking instruction $$w_{KL} = w_K \oplus w_L,$$

the key word $w_{KL}$ being obtained at the receiver. If the data sink 3 at the receiver is in synchronizm with data source 1 at the transmitter, then the sequence of the transmitted modified code words $c'_L$ will correspond to the sequence of the received modified code words $c_K$. That is to say, K=L. The code modification introduced at the transmitter by the addition to each code word of the protection word $w_L$ will therefor be eliminated at the receiver by the addition of a check word $w_K$ which is the same as the protection word $W_L$.

To ensure unambiguous recognition of faulty synchronization of a linear block code having a level e of error correction (as explained hereinafter), the protection or check words $w_L$ or $w_K$ must be chosen such that the resulting key words $w_{KL}$ are in a secondary class of code words which are not used for decoding. Such a secondary class can be determined, for example, by syndrome formation.

Using a linear, systematic (16, 8, 5) block code, code words may be generated in accordance with the polynomial $g(x) = x^8 + x^7 + x^6 + x^4 + x^2 + x + 1$. This is capable of correcting up to two errors. The Table in FIG. 4 shows, for a message M having ten such code words L, the selected protection words $w_L$ (which are the same as the check words $w_K$) to be associated with them. The decimal values $z_L$ of the bit samples of the associated protection words $w_L$ (and check words $w_K$) and the positions of the bit samples are indicated in the Table.

The bit samples of the protection words $w_L$ or check words $w_K$ are then chosen so that when those words are linked a key word $w_{KL}$ is obtained which has a greater Hamming distance than the number e of the corrected errors of each code word. In addition, the bit samples should be such that the key word $w_{KL}$ produced for K=L is not a code word used for decoding. It can be demonstrated that this means that the bit samples searched for must be elements such that the key words $w_{KL}$ produced for K=L will be in a secondary class of code words which are not used for decoding.

In event of faulty synchronization the bit samples of $w_L$ and $w_K$ will not agree. In addition to the code violation caused at the transmitter by adding to the code words $c_L$ the bit samples of the protection word $w_L$, there will be further code violations caused at the receiver by adding the bit samples of the check words $w_K$ to the received code words. The sum of the binary positions (code elements) thus invalidated in a received code word $c_K$ may therefore exceed the number e of correctable errors.

FIG. 5 shows, for a linear systematic (16, 8, 5) block code having an error-correction level e=2, the matrix of key words $w_{KL}$ which is obtained by linking the bit samples of the protection words $w_K$ with the bit samples of the check words $w_L$ of FIG. 4. From the specified secondary class conditions a quadrapole (25, 44, 138, 201) can be determined as a bit sample, which quadrapole covers a sub-storage area having sixteen bit samples. From these sixteen bit samples ten are chosen which are indicated in the Table of FIG. 4. The Table of FIG. 5 shows all the possible combinations of these ten bit samples.

The key words $w_{KL}$ obtained by such linking and having the decimal representations 111 and 118 are elements of a secondary class $N_t$ of code words of a code having a minimum Hamming distance equal to two. For example, as a result of the faulty synchronization, the key word $w_{KL}$ having the decimal number 25 is combined with check word $w_L$ having the decimal number 111. The key word $w_{KL}$ which is obtained as the result of a bit shift through seven positions and which has the decimal number 118 (code word) contains two errors and is consequently capable of error correction. Key words $w_{KL}$ of such secondary classes $N_t$ are identified by a negative sign in FIG. 5. Such key words $w_{KL}$ occur only if there is a shift through more than seven bit positions, the probability of such a shift being very small.

From the above descriptions, it will be evident that the probability that faulty synchronization is not recognized can be reduced by a method in accordance with the invention. Thus, distortion of messages caused by faulty synchronization can be avoided.

What is claimed is:

1. A method of synchronizing a data sink with a data source in a data transmission system in which data provided by the data source is encoded as code words ($c_L$) in a linear block code and such code words are transmitted as messages over a transmission channel in the form of sequentially linked modified code words ($c'_L$), the modified code words ($c'_L$) being formed by linking each data code word ($c_L$) to a protection word ($w_L$) which is transmitted over such transmission channel, characterized in that: each protection word ($w_L$) identifies the position within the transmitted message of the code word ($c_L$) linked thereto; the modified code words ($c'_L$) are interleaved bit-sequentially, transmitted, and at the receiver are de-interleaved to derive received code words ($c_K$); and each received code word ($c_K$) is linked to a check word ($w_K$) which characterizes the position of such code word ($c_K$) within the received message.

2. A method as claimed in claim 1, further characterized in that at the receiver the protection words ($w_L$) of the transmitted code words ($c'_L$) are combined with the check words ($w_K$) of the received code words ($c_K$), the lengths of the protection words and check words being a portion of the length of the code words.

3. A method as claimed in claim 2, further characterized in that linking of each data code word ($c_L$) with a protection word ($w_L$) and linking each received code word ($c_K$) with the check word ($w_K$) is effected by a bit-wise modulo-2 adding operation.

4. A method as claimed in claim 2, further characterized in that the check words ($w_K$) are the same as the protection words ($w_L$) and are selected such that key words ($w_{KL}$) which result from combining the protection words ($w_L$) with the check words ($w_K$) are in secondary classes of code words other than the code words used for encoding the data provided by the data source.

5. A method as claimed in claim 4, further characterized in that the protection words ($w_L$) and check words ($w_K$) are code words of a linear code.

* * * * *